(12) United States Patent
Arimilli et al.

(10) Patent No.: US 6,286,068 B1
(45) Date of Patent: Sep. 4, 2001

(54) QUEUED ARBITRATION MECHANISM FOR DATA PROCESSING SYSTEM

(75) Inventors: Ravi Kumar Arimilli, Round Rock; John Michael Kaiser, Cedar Park, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/138,869

(22) Filed: Aug. 24, 1998

Related U.S. Application Data

(63) Continuation of application No. 08/317,006, filed on Oct. 3, 1994, now Pat. No. 6,029,217.

(51) Int. Cl.⁷ .................................................. G06F 13/00
(52) U.S. Cl. ..................... 710/107; 710/113; 710/116; 710/39
(58) Field of Search ................... 710/113, 107, 710/110, 112, 114, 116, 36, 39, 40, 41

(56) References Cited

U.S. PATENT DOCUMENTS

| | | | | |
|---|---|---|---|---|
| 4,482,949 | * | 11/1984 | Gates ........................... | 710/40 |
| 4,924,380 | | 5/1990 | McKinney et al. ............. | 364/200 |
| 4,953,081 | * | 8/1990 | Feal et al. ..................... | 710/111 |
| 5,006,982 | * | 4/1991 | Ebersole et al. .............. | 710/263 |
| 5,050,066 | * | 9/1991 | Myers et al. .................. | 395/775 |
| 5,103,393 | * | 4/1992 | Harris et al. .................. | 709/226 |
| 5,202,966 | * | 4/1993 | Woodson ........................ | 710/117 |
| 5,303,382 | | 4/1994 | Buch et al. .................... | 395/725 |
| 5,335,335 | * | 8/1994 | Jackson et al. ................ | 395/473 |
| 5,416,910 | * | 5/1995 | Moyer et al. .................. | 710/128 |
| 5,426,765 | * | 6/1995 | Stevens et al. ................ | 395/473 |
| 5,442,634 | * | 8/1995 | Cizek ............................. | 370/329 |
| 5,448,701 | * | 9/1995 | Metz, Jr. et al. .............. | 710/29 |
| 5,473,762 | * | 12/1995 | Krein et al. .................... | 710/118 |
| 5,485,586 | * | 1/1996 | Brash et al. ................... | 710/113 |
| 5,506,995 | * | 4/1996 | Yoshimoto et al. ........... | 710/107 |
| 5,623,628 | * | 4/1997 | Brayton et al. ............... | 711/141 |

FOREIGN PATENT DOCUMENTS

| | | |
|---|---|---|
| 0 488 771 A2 | 6/1992 | (EP) . |
| 4-116762 | 4/1972 | (JP) . |
| 1-305461 | 12/1989 | (JP) . |
| 2-79153 | 3/1990 | (JP) . |
| 2-222058 | 9/1990 | (JP) . |
| 4-311250 | 11/1992 | (JP) . |
| 5-210640 | 8/1993 | (JP) . |
| 5-313923 | 11/1993 | (JP) . |
| WO 91/20041 | 12/1991 | (WO) . |

\* cited by examiner

*Primary Examiner*—Ario Etienne
(74) *Attorney, Agent, or Firm*—Kelly K. Kordzik; Winstead Sechrest & Minick P.C.; Anthony V. S. England

(57) ABSTRACT

A queued arbitration mechanism transfers all queued processor bus requests to a centralized system controller/arbiter in a descriptive and pipelined manner. Transferring these descriptive and pipelined bus requests to the system controller allows the system controller to optimize the system bus utilization via prioritization of all of the requested bus operations and pipelining appropriate bus grants. Intelligent bus request information is transferred to the system controller via encoding and serialization techniques.

20 Claims, 3 Drawing Sheets

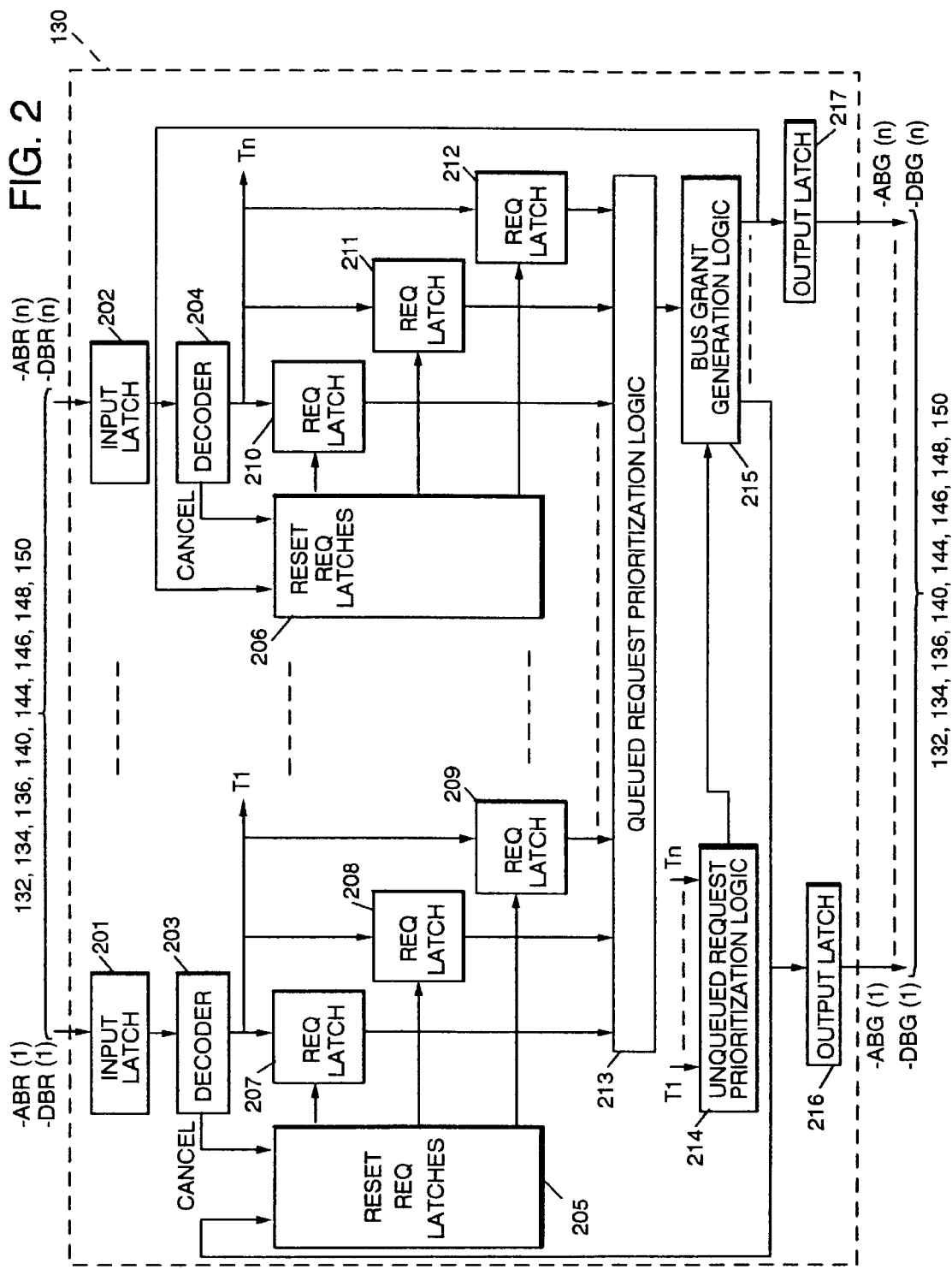

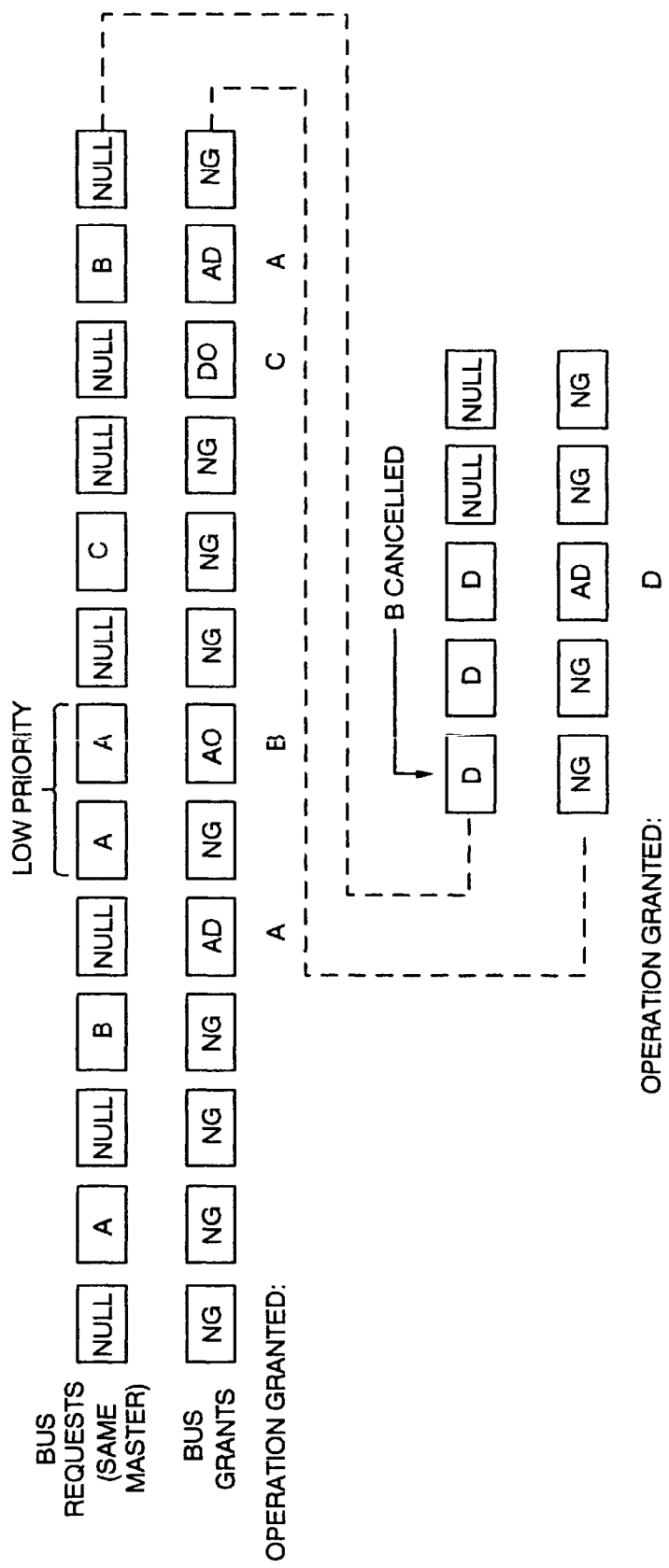

QUEUED ARBITRATION MECHANISM FOR DATA PROCESSING SYSTEM

This is a continuation of application Ser. No. 08/317,006 filed Oct. 3, 1994 U.S. Pat. No. 6,029,217.

CROSS REFERENCE TO RELATED APPLICATIONS

This application for patent is related to the following applications for patent filed concurrently herewith:

EFFICIENT ADDRESS TRANSFER TECHNIQUE FOR A DATA PROCESSING SYSTEM, Ser. No. 08/317,007, issued as U.S. Pat. No. 5,687,327;

DUAL LATENCY STATUS AND COHERENCY REPORTING FOR A MULTIPROCESSING SYSTEM, Ser. No. 08/316,980, issued as U.S. Pat. No. 5,608,878;

SYSTEM AND METHOD FOR DETERMINING SOURCE OF DATA IN A SYSTEM WITH INTERVENING CACHES, Ser. No. 08/317,256;

METHOD AND APPARATUS FOR REMOTE RETRY IN A DATA PROCESSING SYSTEM, Ser. No. 08/316,978;

ARRAY CLOCKING METHOD AND APPARATUS FOR INPUT/OUTPUT SUBSYSTEMS, Ser. No. 08/316,976;

DATA PROCESSING SYSTEM HAVING DEMAND BASED WRITE THROUGH CACHE WITH ENFORCED ORDERING, Ser. No. 08/316,979;

COHERENCY AND SYNCHRONIZATION MECHANISMS FOR I/O CHANNEL CONTROLLERS IN A DATA PROCESSING SYSTEM, Ser. No. 08/316,977, issued as U.S. Pat. No. 5,613,153;

ALTERNATING DATA VALID CONTROL SIGNALS FOR HIGH PERFORMANCE DATA TRANSFER, Ser. No. 08/326,190;

LOW LATENCY ERROR REPORTING FOR HIGH PERFORMANCE BUS, Ser. No. 08/326,203.

Each of such cross-referenced applications are hereby incorporated by reference into this Application as though fully set forth herein.

TECHNICAL FIELD OF THE INVENTION

The present invention relates in general to data processing systems and, in particular, to a system and method for intelligent communication of bus requests and bus grants within a data processing system.

BACKGROUND OF THE INVENTION

Conventional data processing systems, especially multi-processor systems, allocate access to the shared system bus coupling the various bus devices to system memory through a mechanism whereby individual bus devices each control access to the system bus. Typically, each bus device will queue it's individual bus requests for various operations internally. Then, each bus device makes the determination of which of the various operations it wishes to perform on the system bus by sending the appropriate corresponding bus request to the system controller. Thus, each individual bus device determines internally which of its bus request has higher priority. The system controller is then required to arbitrate between the received bus requests from the individual bus devices.

One disadvantage of this arbitration mechanism is that a portion of the decision process for accessing the various resources coupled to the system bus is delegated to each of the bus devices. As a results, the system controller is only able to view a portion of all of the various requests from the individual bus devices, since each of the individual bus devices retains and queues a significant number of bus request. Thus, there is a need in the art for a more efficient arbitration mechanism for granting access to the system bus.

SUMMARY OF THE INVENTION

It is an object of the present invention to centralize the decision-making process for granting access to the system bus. In an attainment of this object, the present invention provides a mechanism of transferring all of the queued bus requests from the individual bus devices to the system controller, which has a centralized knowledge of the availability of all of the system resources coupled to the system bus.

The system controller samples the bus devices' requests on a cycle-by-cycle basis. The requests are encoded, which allows each of the bus devices to precisely communicate to the system controller each of their internally "queued" operations. Quickly transferring these "descriptive and pipelined" bus requests from each of the bus devices to a centralized control point, allows the system controller to "optimize" the system bus utilization by prioritizing all of the requested bus operations and pipelining the appropriate bus grants.

One advantage of the present invention is that it provides an ability to transfer "intelligent" bus request information from each bus device to the system controller, and provides the ability to transfer multiple packets of bus requests information (via encoding and serialization techniques).

Another advantage of the present invention is that the bus requests are compact and can be issued in a pipelined manner and that bus grants may be pipelined to either the same bus device or different bus devices.

Yet another advantage of the present invention is that it supports latch-to-latch or non-latch-to-latch implementations. Those skilled in the art will appreciate the benefit of accommodating both implementations. (Latch-to-latch implementations allow higher system bus clocks rates, while non-latch-to-latch implementations provides lower system bus latencies.)

Yet still another advantage of the present invention is that the queuing of descriptive bus requests allows the system controller to efficiently control, distribute, and allocate system bus resources.

And, yet still another advantage of the present invention is that the system controller may resolve system level multiprocessor problems such as deadlocks and livelocks. Unlike traditional arbitration techniques, the present invention bus does not require bus devices to adhere to any arbitration "fairness" protocols.

Another advantages of the present invention is that the bus devices may support speculative bus requests and the system controller may support speculative bus grants.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now

FIG. 2 illustrates a block diagram of the system controller illustrated in FIG. 1; and FIG. 3 illustrates an exemplary protocol for granting bus grants for bus requests from one of the bus devices illustrated in FIG. 1.

DETAILED DESCRIPTION OF A PREFERRED EMBODIMENT OF THE INVENTION

Figure 1:
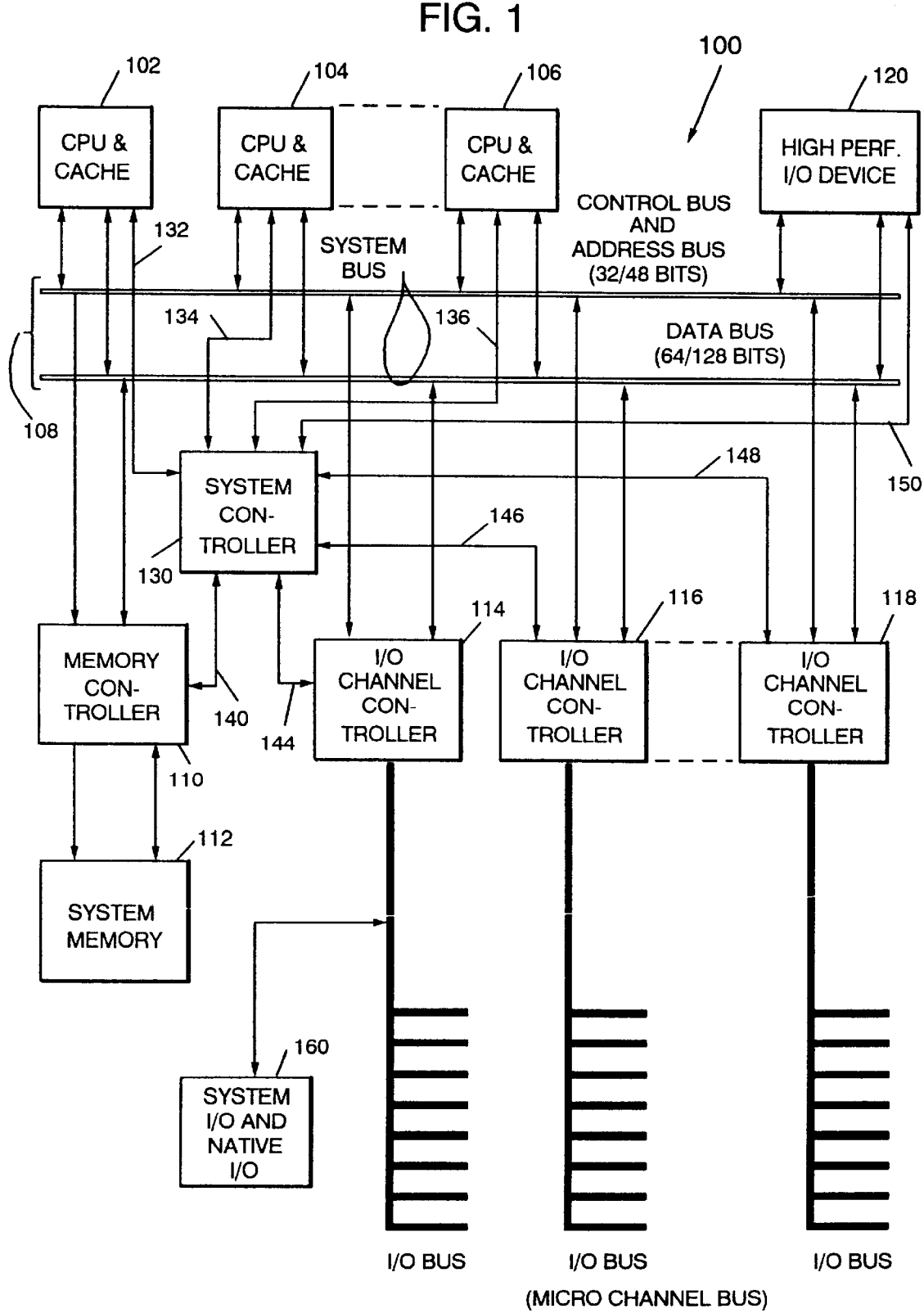
FIG. 1 illustrates a block diagram of a data processing system in accordance with the present invention.

With the foregoing hardware in mind, it is possible to explain the process-related features of the present invention. To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Referring now to FIG. 1, a data processing system which advantageously embodies the present invention will be described. Multiprocessor system 100 includes a number of processing units 102, 104, 106 operatively connected to a system bus 108. Also connected to the system bus 108 is a memory controller 110, which controls access to system memory 112, and I/O channel controllers 114, 116, and 118. Additionally, a high performance I/O device 120 may be connected to the system bus 108. Each of the system elements described 102–120, inclusive, operate under the control of system controller 130 which communicates with each unit connected to the system bus 108 by point to point lines such as 132 to processor 102, 134 to processor 104, 136 to processor 106, 140 to memory controller 110, 144 to I/O channel controller 114, 146 to I/O channel controller 116, 148 to I/O channel controller 118, and 150 to high performance I/O device 120. Requests and grants of bus access are all controlled by system controller 130.

I/O channel controller 114 controls and is connected to system I/O subsystem and native I/O subsystem 160.

Each processor unit 102, 104, 106 may include a processor and a cache storage device.

The present invention may be implemented with a clock synchronous system bus and separate address and data buses. Furthermore, as illustrated in FIG. 1, bus requests and bus grants are transferred, in a preferred embodiment, point-to-point (unidirectionally or bidirectionally) between the bus devices and system controller 130. This unidirectional point-to-point topology is capable of supporting totally independent and concurrent address and data bus requests and address and data bus grants. Additionally, it provides for system scalability without affecting the request-to-grant speed, and is capable of supporting a "private" communication protocol between the various bus devices and system controller 130.

Some of the possible encoded bus requests may be as follows:

| XBR | −ABR | −DBR | Code | Address Bus Request | Data Bus Request | Queued Request | Cancel Queued Requests | Request Priority | Typical Bus Operation |
|---|---|---|---|---|---|---|---|---|---|
| 0 | 0 | 0 | (A) | Yes | Yes | Yes | No | High Low | Store/Push Retried Store, Cast Out, Speculative Store |
| 0 | 0 | 1 | (B) | Yes | No | Yes | No | High Low | Load/Address Only Retried Load/ Address Only, Speculative Load/ Address Only |
| 0 | 1 | 0 | (C) | No | Yes | Yes | No | High | Load Reply/Intervention |
| 0 | 1 | 1 | NULL | No | No | No | No | — | NULL |
| 1 | 0 | 0 | (D) | Yes | Yes | No | Yes | High | Store/Push |
| 1 | 0 | 1 | (E) | Yes | No | No | Yes | High | Load/Address Only |
| 1 | 1 | 0 | (F) | No | Yes | No | Yes | High | Load Reply/ Intervention |
| 1 | 1 | 1 | CNCL | No | No | No | Yes | — | CANCEL ALL REQUESTS |

Possible bus grants may be encoded as follows:

| −ABG | −DBG | CODE | Description | Grant to which Bus Requests | Typical Bus Operation |
|---|---|---|---|---|---|
| 0 | 0 | (AD) | Address and Data Bus Grant | A or D | Store or Push or Cast Out |
| 0 | 1 | (AO) | Address Only Bus Grant | B or E | Load or Address Only |
| 1 | 0 | (DO) | Data Only Bus Grant | C or F | Load Reply or Intervention |
| 1 | 1 | (NG) | No Grant | — | — |

In the above tables, XBR represents a control bit, while −ABR and −DBR represent address bus requests and data bus requests, respectively. −ABG and −DBG represent address bus grants and data bus grant, respectively. As may be noted in the above bus request table, a "1" in the XBR portion of the bus request code represents that a particular bus device is sending a request that is not to be queued and which cancels all previously queued requests from that particular bus device.

Note that the terms "Cast Out", "Store", "Push", "Load", "Address Only", "Load Reply", "Intervention", "Speculative Load", "Retried Store", "Load Reply", "Retried Load" are all terms for operations well-known in the art and are to be interpreted according to their traditional references in the art.

Referring next to FIG. 2, there is illustrated a block diagram of system controller 130. System controller 130, as previously illustrated in FIG. 1, is coupled to the various bus devices via lines 132, 134, 136, 140, 144, 146, 148 and 150. These lines carry the encoded bus requests and transmit the encoded bus grant information to and from the bus devices.

In the following discussion, reference will only be made to input latch 201, decoder 203, reset request latches 205 and request latches 207–209, which are coupled to processor 102 via connection 132. Components 202, 204, 206, 210, 211, 212 operate in a similar manner, and may be coupled to I/O channel controller 118 via connection 148.

When a bus device, such as processor 102 sends a bus request to system controller 130 via line 132, it is received by input latch 201. Latches 201, 202, 216 and 217 assist in implementing system controller 130 with the bus devices in system 100 within a latch-to-latch implementation.

As bus requests are sent from processor 102 to system controller 130, they are latched into input latch 201 and decoded by decoder 203. If the bus requests are to be queued requests, they are then latched in succession into request latches 207–209. In a preferred embodiment of the present invention, system controller 130 implements a 3-deep queue. Of course, system controller 130 could be designed by one skilled in the art to implement various of N-deep queues, where N>0. Note that at the same time that processor 102 is sending queued requests to system controller 130 as described above, other bus devices, such as I/O channel controller 118 may also be sending bus request, whether queued or not queued, to be latched into request latches 210–212.

Queued request prioritization logic 213 then observes all latched requests from all bus devices via latches 207–212, and prioritizes their requests to determine which are to be given bus grants first. For example, by reference to the bus request table above, high priority requests will be granted access to system bus 108 before low priority requests. Furthermore, logic 213 may be designed for a particular system 100 to grant bus 108 for a load bus request before a store bus request. One skilled in the art may easily implement any desired priorities for determining which requests are to receive granting of bus 108 and in what order for implementation within logic 213.

As logic 213 determines which queued request to grant the bus to next, it then signals bus grant generation logic 215 of which encoded grant to generate and to which bus device.

If decoder 203 receives one of the bus requests from the bus request table that requires previously queued requests to be cancelled, decoder 203 will signal reset request latch 205, which resets request latches 207–209, cancelling previous requests from processor 102. Decoder 203 also sends these unqueued requests to unqueued request prioritization logic 214, which also performs a prioritization process between the unqueued requests received by logic 214. Logic 214, upon determining which of the unqueued requests is to be granted access to system bus 108 next, signals logic 215 of such a decision. Again, one skilled in the art may easily implement any desired priorities for determining which unqueued request are to receive granting of bus 108. Logic 215 receives a prioritized queued request and a prioritized unqueued request, and determines which of these is to be granted access to system bus 108 next. Generally, since unqueued requests have a high priority, they will be granted access to system bus 108 before queued requests.

Bus grant generation logic 215 generates the encoded bus grants illustrated in the table above. These bus grants are latched out of system controller 130 by output latches 216–217. Thus, if logic 213 determines that a queued request from processor 102 is to receive the next bus grant, bus grant generation logic 215 will produce the appropriate encoded grant, which will be latched from latch 216 to processor 102, which will then utilize system bus 108 in the requested manner.

Also, the encoded grant from bus grant generation logic 215 will be used by reset request latches 205 to reset the appropriate queued request latch 207, 208, or 209.

Referring next to FIG. 3, there is illustrated an exemplary protocol of bus requests and bus grants for one of the bus devices, such as processor 102. The bus requests are pipelined and sent from processor 102 via line 132 to system controller 130 as indicated. Through the above-described process, system controller produces the pipeline of bus grants as indicated in FIG. 3. Note the numerous "no grants" ("NGs") within the pipeline of grants, which may indicate that one or more of the other bus devices in system 100 is currently being served by system controller 130. The "null" notations indicate that processor 102 is currently not transmitting a bus request.

Since a queued bus request may have previously been transmitted by processor 102, a "null" request does not imply that processor 102 does not need access to the system bus 108.

The example shows that processor 102 is first in need of a store or push bus operation (noted by code A) and is next in need of a load or address only operation (noted by code B). At some time later, system controller 130 grants the address and data bus for the code A requested operation and then later grants the address bus only in response to the code B request.

The example bus request pipeline also indicates a serialization technique whereby two consecutive encoded requests from a particular bus device indicated to system controller 130 that the bus request is a low priority request. Such a low priority request may be in response to a previously "retried" bus operation from one of the other bus devices. Retries on the system bus 108 often result in prolonged livelocks and maybe even a deadlock. A deadlock may be defined as an infinite livelock. A livelock may be defined as a condition on the system bus 108 in which a bus device "A" retries an operation by bus device "B" and bus device "B" retries an operation by bus device "A" and this cyclical pattern continues until another condition "alters" this pattern. Livelock conditions are well known in the art. Livelock conditions severely degrade system performance due to the inefficient usage of the system bus resources. Therefore, it is advantageous to differentiate a bus request from a previously retried bus request. Furthermore, retried bus requests often get retried again due to "busy" system resources. Thus, it is also advantageous to have these retried bus requests contain a low priority in order to more efficiently utilize the system bus resources. It may further be preferable, then, to grant access to the bus for low priority requests in a randomized fashion and high priority requests in prioritized fashion. The random generation of grant to low priority requests avoids the cyclical system bus retries, thus avoiding livelocks and deadlocks. The prioritized generation of grant to high and low priority requests efficiently realizes the system bus bandwidth.

As indicated within FIG. 3, the bus request encoded as a load reply or intervention, is given a data only bus grant before the address and data bus grant in response to the low priority requests (encoded with an A). This illustrates how system controller 130 granted access to bus 108 to a higher priority request instead of a low priority request.

Also illustrated is how the second bus request B is cancelled by bus request D, which is indicated in the bus request table is not intended to be a queued request, and which informs system controller 130 to cancel all previous requests from processor 102. Since bus request D is not queued inside controller 130, bus request D remains active until it receives a grant. Such a situation is decoded by decoder 203 and transferred to unqueued request prioritization logic 214, which informs bus grant generation logic 215 of the unqueued request. Furthermore, decoder 203 informs reset request latches 205 to cancel all previous requests within the queued request latches 207–209.

In the above bus request and bus grant tables, intervention refers to a situation where another bus device has snooped a bus request and has determined that it contains within its internal cache a "dirty," or modified version of the requested data. A mechanism is then set in motion whereby the requesting bus device is informed that data is to be received from the other bus device instead of system memory. A further discussion of "intervention" is supplied within cross-referenced U.S. patent application Ser. No. 08/317,256, which is hereby incorporated by reference herein.

Note that the XBR bus request signal need not be implemented in all systems. For low cost systems, the XBR information may be configured to a specific value in system controller 130 for certain bus devices.

Note that there is capacity for other encoded requests and grants via serialization techniques or the addition of bus and grant signals. Furthermore, other types of requests and other protocols may be designed into the system of the present invention as desired.

Although the present invention and its advantages have been described in detail, it should be understood that various changes, substitutions and alterations can be made herein without departing from the spirit and scope of the invention as defined by the appended claims.

What is claimed is:

1. A computer system comprising:
   a plurality of bus devices including one or more processors and one or more storage devices;
   a system controller;
   a bus architecture coupling said plurality of bus devices and said system controller;
   first circuitry adaptable for transferring each address and data bus request from said plurality of bus devices to said system controller as said each address and data bus request is generated by said plurality of bus devices; and
   second circuitry adaptable for transferring, from said system controller to said plurality of bus devices, responses to said each address and data bus request, wherein more than two bus requests from any one of said plurality of bus devices are queued within said system controller.

2. A computer system, comprising:
   a plurality of bus devices including one or more processors and one or more storage devices;
   a system controller;
   a bus architecture coupling said plurality of bus devices and said system controller;
   first circuitry adaptable for transferring each address and data bus request from said plurality of bus devices to said system controller as said each address and data bus request is generated by said plurality of bus devices; and
   second circuitry adaptable for transferring, from said system controller to said plurality of bus devices, responses to said each address and data bus request, wherein said first circuitry adaptable for transferring further comprises:
      a plurality of latches, each adaptable for receiving a bus request in pipeline fashion from one particular bus device coupled to said system controller; and
      logic circuitry for choosing any one of said bus requests from said plurality of latches for issuing a bus grant in response thereto, wherein said second circuitry adaptable for transferring further comprises:
         circuitry for pipelining bus grants to each one of said plurality of bus devices.

3. A computer system comprising:
   a plurality of bus devices including one or more processors and one or more storage devices;
   a system controller;
   a bus architecture coupling said plurality of bus devices and said system controller;
   first circuitry adaptable for transferring each address and data bus request from said plurality of bus devices to said system controller as said each address and data bus request is generated by said plurality of bus devices; and
   second circuitry adaptable for transferring, from said system controller to said plurality of bus devices, responses to said each address and data bus request, and wherein at least one of said each address and data bus request is a speculative bus request.

4. A computer system comprising:
   a plurality of bus devices including one or more processors and one or more storage devices;
   a system controller;
   a bus architecture coupling said plurality of bus devices and said system controller;
   first circuitry adaptable for transferring each address and data bus request from said plurality of bus devices to said system controller as said each address and data bus request is generated by said plurality of bus devices; and
   second circuitry adaptable for transferring, from said system controller to said plurality of bus devices, responses to said each address and data bus request, and wherein one of said each address and data bus request cancels all previous bus requests from one of one of said plurality of bus devices generating said one of said each address and data bus request.

5. A computer system comprising:
   a plurality of bus devices including one or more processors and one or more storage devices;
   a system controller;
   a bus architecture coupling said plurality of bus devices and said system controller;

first circuitry adaptable for transferring each address and data bus request from said plurality of bus devices to said system controller as said each address and data bus request is generated by said plurality of bus devices; and second circuitry adaptable for transferring, from said system controller to said plurality of bus devices, responses to said each address and data bus request, and wherein said responses are ordered by said system controller according to priority levels of said each address and data bus requests and according to an availability of system recourses.

6. A computer system comprising:

a plurality of bus devices including one or more processors and one or more storage devices;

a system controller;

a bus architecture coupling said plurality of bus devices and said system controller;

first circuitry adaptable for transferring each address and data bus request from said plurality of bus devices to said system controller as said each address and data bus request is generated by said plurality of bus devices; and second circuitry adaptable for transferring, from said system controller to said plurality of bus devices, responses to said each address and data bus request, and wherein one or more of said one or more processors are a plurality of virtual processors all coupled to said system controller by one port into said system controller.

7. A method of arbitrating bus access in a multiprocessor system, said method comprising the steps of:

sampling bus requests from a plurality of bus devices within said multiprocessor system, wherein said sampling is performed every bus cycle; and responding to said bus requests from said plurality of bus devices, wherein responses to a plurality of bus requests from any one of said plurality of bus devices are pipelined.

8. A method of arbitrating bus access in a multiprocessor system, said method comprising the steps of:

sampling bus requests from a plurality of bus devices within said multiprocessor system; and responding to said bus requests from said plurality of bus devices, and wherein said sampling of said bus requests is performed by a system controller coupled in a point-to-point manner to said plurality of bus devices, further comprises the step of:

queuing in said system controller more than two of said sampled bus requests received from any one of said plurality of bus devices.

9. A method of arbitrating bus access in a multiprocessor system, said method comprising the steps of:

sampling bus requests from a plurality of bus devices within said multiprocessor system;

responding to said bus requests from said plurality of bus devices;

encoding by said plurality of bus devices said bus requests; and determining which one of said encoded bus requests to issue a bus grant to as a function of said encoding of said bus request.

10. The method as recited in claim 9, wherein said encoding step further comprises the step of:

encoding one of said bus requests to be a request for a store operation.

11. The method as recited in claim 9, wherein said encoding step further comprises the step of:

encoding one of said bus requests to be a request for a load operation.

12. The method as recited in claim 9, wherein said encoding step further comprises the step of:

encoding one of said bus requests to be a request for a load reply.

13. The method as recited in claim 9, wherein said encoding step further comprises the step of:

encoding one of said bus requests to be a request for a retry store operation.

14. The method as recited in claim 11, wherein said responding step further comprises the step of:

encoding a response to said one of said bus requests to be a bus grant for said load operation.

15. The method as recited in claim 10, wherein said responding step further comprises the step of:

encoding a response to said one of said bus requests to be a bus grant for said store operation.

16. The method as recited in claim 9, wherein said encoding step further comprises the step of:

encoding one of said bus requests to be a high priority bus request.

17. A method of arbitrating bus access in a multiprocessor system, said method comprising the steps of:

sampling bus requests from a plurality of bus devices within said multiprocessor systems;

responding to said bus request from said plurality of bus devices; and encoding one of said bus requests to cancel all previous bus requests from one of said plurality of bus devices generating said encoded one of said bus requests.

18. A method of arbitrating bus access in a multiprocessor system, said method comprising the steps of:

sampling bus requests from a plurality of bus devices within said multiprocessor system;

responding to said bus requests from said plurality of bus devices;

encoding by said plurality of bus devices said bus requests; and determining which one of said encoded bus requests to issue a bus grant to as a function of said encoding of said bus requests, wherein said encoding step further comprises the step of encoding two consecutive bus requests to be a low priority bus request.

19. The method as recited in claim 18, wherein the step of encoding two consecutive bus requests to be a low priority bus request is an issue of a first one of said each address and data bus request on a first one of said at least two consecutive bus cycles and an issue of a second one of said each address and data bus request on a second one of said at least two consecutive bus cycles, wherein said first one and said second one of said each address and data bus requests are separate address and data bus requests from a same one of said plurality of bus devices.

20. The method as recited in claim 18, wherein said low priority bus request is an issue of two separate address and data bus requests on said at least two consecutive bus cycles from a same one of said plurality of bus devices.

* * * * *